H. E. EVANS.
PRIMARY ELECTRIC CELL.
APPLICATION FILED FEB. 21, 1918.
1,310,695.
Patented July 22, 1919.
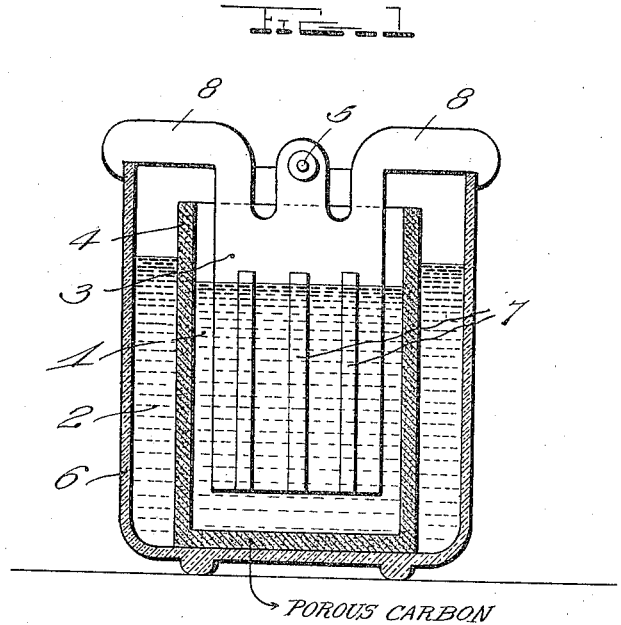
POROUS CARBON
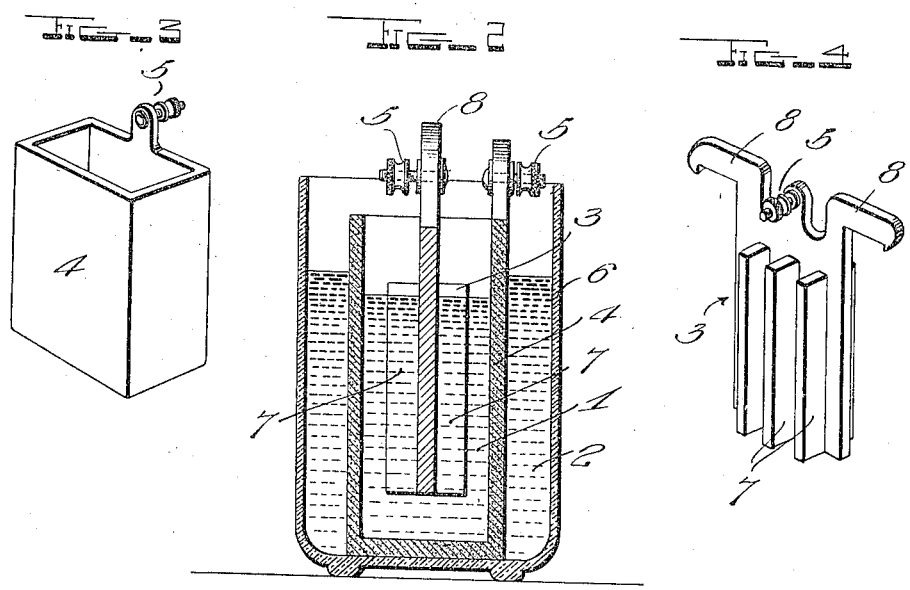
Witness
Inventor
Harry E. Evans
By H. B. Willson & Co
Attorneys

UNITED STATES PATENT OFFICE.

HARRY E. EVANS, OF BUFFALO, NEW YORK.

PRIMARY ELECTRIC CELL.

1,310,695.   Specification of Letters Patent.   Patented July 22, 1919.

Application filed February 21, 1918.   Serial No. 218,571.

*To all whom it may concern:*

Be it known that I, HARRY E. EVANS, a citizen of the United States, residing at Buffalo, in the county of Erie and State of New York, have invented certain new and useful Improvements in Primary Electric Cells; and I do declare the following to be a full, clear, and exact description of the invention, such as will enable others skilled in the art to which it appertains to make and use the same.

My invention relates to improvements in primary electric cells of the type employing two fluids, that is an electrolyte for action upon the negative or zinc pole, and a depolarizing fluid to prevent accumulation of hydrogen bubbles on the positive or carbon pole. Heretofore cells of this type have been provided with a barrier of porous material to separate the two fluids in which the positive and negative poles are respectively immersed, and still permit sufficient permeation to obtain the required depolarizing results. The object of my invention however is to combine the barrier and the positive pole in a single element, thus not only simplifying and cheapening the cell, but decreasing the internal resistance caused by the porous barriers now in use and providing for a high and constant voltage.

The above object is obtainable in a number of ways, but the accompanying description and drawing will suffice to disclose the essential features.

In the drawing, Figure 1 is a vertical section of the improved cell showing the zinc or negative element in elevation;

Fig. 2 is a vertical section at right angles to Fig. 1;

Fig. 3 is a perspective view of the combined positive pole and barrier between the two fluids; and Fig. 4 is a perspective view of the negative pole.

Briefly speaking, the invention consists of an electrolyte 1, a depolarizing fluid 2, a negative pole 3 subjected to said electrolyte, and a combined barrier and positive pole 4 separating the two liquids and sufficiently porous to permit the depolarizing fluid to permeate in such a manner as to prevent the accumulation of hydrogen bubbles. The two poles 3 and 4 are provided with suitable binding posts or other means 5 for connecting wires or the like thereto, and these connections may be located at any preferred point.

In the form of the invention disclosed, the body of depolarizing fluid 2 is contained in an outer receptacle or jar 6 formed of glass or other appropriate insulating material and of any required shape. The combined barrier and positive pole 4 is in the form of an inner receptacle of suitable size and shape formed of carbon and immersed in the fluid 2 with its wall in spaced relation to the wall of the outer receptacle 6, said inner receptacle 4 containing the electrolyte 1 in which the negative pole 3 is immersed, said pole being by preference in the form of a vertical plate having ribs 7 exposed to the electrolyte 1, the upper end of said plate being provided with a pair of lateral arms 8 which rest on the upper edge of the receptacle 6 and hold the pole 3 in spaced relation with the member 4.

By combining the porous barrier and the positive element or pole of the cell in a single member, the internal resistance is decreased with the result that higher and more constant voltage are obtained. Also, the device is greatly simplified and cheapened. The electrolyte 1 acts chemically on the zinc pole 3 in the usual manner, and the accumulation of hydrogen bubbles on the positive or carbon pole 4 is prevented by the seepage of the depolarizing fluid 2 through the carbon of which said positive pole is formed.

Since various of the well known electrolytes and depolarizing fluids may be used in this cell, I have not stated any particular examples and I do not wish to be limited in that respect.

The form of the invention shown and described is extremely simple and inexpensive, yet is highly efficient and for these reasons this form is preferable, but I wish it understood that the invention may be embodied in a number of other ways and that the sizes and shapes of the several parts are immaterial, the essential feature being a combined pole and barrier separating the electrolyte from the depolarizing fluid.

I claim:

An electric primary cell comprising a glass jar, a carbon receptacle in said jar, resting on the bottom thereof, and forming a combined barrier and positive pole, a depolarizing fluid in said jar and surrounding said carbon receptacle, an electrolyte in said carbon receptacle, a negative pole in the form of a zinc plate in said carbon receptacle and immersed in said electrolyte, arms extending laterally from said negative pole over said carbon receptacle and resting on the upper edge of said glass jar, and binding posts on said carbon receptacle and said zinc plate.

In testimony whereof I have hereunto set my hand.

HARRY E. EVANS.

Copies of this patent may be obtained for five cents each, by addressing the "Commissioner of Patents, Washington, D. C."